(12) United States Patent
Chae et al.

(10) Patent No.: US 12,009,502 B2
(45) Date of Patent: Jun. 11, 2024

(54) METHOD OF PRODUCING NEGATIVE ELECTRODE

(71) Applicant: LG ENERGY SOLUTION, LTD., Seoul (KR)

(72) Inventors: Oh Byong Chae, Daejeon (KR); Ye Ri Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 470 days.

(21) Appl. No.: 17/605,009

(22) PCT Filed: May 7, 2020

(86) PCT No.: PCT/KR2020/006053
§ 371 (c)(1),
(2) Date: Oct. 20, 2021

(87) PCT Pub. No.: WO2020/231088
PCT Pub. Date: Nov. 19, 2020

(65) Prior Publication Data
US 2022/0216459 A1 Jul. 7, 2022

(30) Foreign Application Priority Data
May 10, 2019 (KR) .......................... 10-2019-0055012

(51) Int. Cl.
*H01M 4/139* (2010.01)
*H01M 4/02* (2006.01)
(Continued)

(52) U.S. Cl.
CPC ......... *H01M 4/139* (2013.01); *H01M 4/0416* (2013.01); *H01M 4/043* (2013.01);
(Continued)

(58) Field of Classification Search
None
See application file for complete search history.

(56) References Cited

U.S. PATENT DOCUMENTS

2012/0055628 A1* 3/2012 Min ...................... H01G 11/50
427/601
2013/0327648 A1* 12/2013 Grant ..................... C25D 3/665
205/59
(Continued)

FOREIGN PATENT DOCUMENTS

CN 207398283 U 5/2018
CN 109148827 A 1/2019
(Continued)

OTHER PUBLICATIONS

Extended European Search Report for European Application No. 20805419.7, dated Apr. 14, 2022.
(Continued)

*Primary Examiner* — Louis J Rufo
(74) *Attorney, Agent, or Firm* — Birch, Stewart, Kolasch & Birch, LLP (57) ABSTRACT

A method of producing a negative electrode is disclosed which is capable of preventing volume expansion and structural deformation caused by pre-lithiation, maintaining proximity and contact between negative electrode active materials, preventing an increase in resistance of a negative electrode, and realizing an excellent capacity retention rate by performing pre-lithiation while pressurizing a negative electrode at a specific pressure. In addition, the method of producing a negative electrode is capable of improving quality consistency of a product and processability by performing pre-lithiation of a negative electrode in a roll-to-roll manner.

14 Claims, 4 Drawing Sheets

(51) Int. Cl.
*H01M 4/04* (2006.01)
*H01M 10/0525* (2010.01)

(52) U.S. Cl.
CPC ..... *H01M 4/0445* (2013.01); *H01M 10/0525* (2013.01); *H01M 2004/027* (2013.01)

(56) References Cited

U.S. PATENT DOCUMENTS

| | | |
|---|---|---|
| 2015/0191841 A1 | 7/2015 | Grant et al. |
| 2015/0333385 A1 | 11/2015 | Sun et al. |
| 2016/0141596 A1 | 5/2016 | Uhm et al. |
| 2016/0181594 A1 | 6/2016 | Balogh et al. |
| 2017/0187030 A1* | 6/2017 | Grant ................... C25D 7/0657 |
| 2019/0109322 A1 | 4/2019 | Grant et al. |
| 2019/0305298 A1 | 10/2019 | Chae et al. |
| 2020/0058929 A1* | 2/2020 | Chae ................... H01M 4/0404 |
| 2020/0235419 A1 | 7/2020 | Chae et al. |
| 2020/0259165 A1 | 8/2020 | Nishihara et al. |
| 2021/0175489 A1 | 6/2021 | Grant et al. |
| 2023/0080998 A1 | 3/2023 | Grant et al. |

FOREIGN PATENT DOCUMENTS

| | | |
|---|---|---|
| CN | 109524621 A | 3/2019 |
| CN | 104081573 A | 4/2024 |
| JP | 2008-16199 A | 1/2008 |
| JP | 2008-77963 A | 4/2008 |
| JP | 2016-110777 A | 6/2016 |
| KR | 10-1999-0086308 A | 12/1999 |
| KR | 10-0291067 B1 | 6/2001 |
| KR | 10-1397415 B1 | 5/2014 |
| KR | 10-2014-0106645 A | 9/2014 |
| KR | 10-2015-0014676 A | 2/2015 |
| KR | 10-2017-0058798 A | 5/2017 |
| KR | 10-1771122 B1 | 9/2017 |
| WO | 2013/082330 A1 | 6/2013 |
| WO | WO 2019/013500 A2 | 1/2019 |
| WO | 2019/031744 A1 | 2/2019 |
| WO | WO 2019/088139 A1 | 5/2019 |
| WO | WO 2018/212453 A1 | 4/2024 |

OTHER PUBLICATIONS

International Search Report for PCT/KR2020/006053 dated Aug. 13, 2020.

* cited by examiner

METHOD OF PRODUCING NEGATIVE ELECTRODE

CROSS-REFERENCE TO RELATED APPLICATION

This application claims priority to and the benefit of Korean Patent Application No. 10-2019-0055012, filed on May 10, 2019, the disclosure of which is incorporated herein by reference in its entirety.

TECHNICAL FIELD

The present invention relates to a method of producing a negative electrode.

BACKGROUND ART

Recently, in response to the rapid spread of electronic devices using batteries, such as mobile phones, notebook computers, and electric vehicles, demand for secondary batteries having a small size, a light weight, and relatively high capacity is rapidly increasing. In particular, lithium secondary batteries have been in the spotlight as a driving power source for portable devices due to having a light weight and high energy density. Accordingly, research and development efforts for improving the performance of lithium secondary batteries have been continuously made.

The lithium secondary battery generally includes a positive electrode, a negative electrode, a separator interposed between the positive electrode and the negative electrode, an electrolyte, an organic solvent, and the like. In addition, in the positive electrode and the negative electrode, an active material layer including a positive electrode active material or a negative electrode active material may be formed on a current collector. In general, a lithium-containing metal oxide such as $LiCoO_2$, $LiMn_2O_4$, or the like is used as a positive electrode active material in the positive electrode, and a carbon-based material or a silicon-based material which does not contain lithium is used as a negative electrode active material in the negative electrode.

In the case of such a negative electrode, a passivation film such as a solid electrolyte interface layer (SEI layer) is formed on the surface of the negative electrode during initial charging. Since the passivation film interferes with the insertion of an organic solvent into the negative electrode and suppresses the decomposition reaction of an organic solvent, the negative electrode structure is stabilized, the reversibility of the negative electrode is improved, enabling the negative electrode structure to be used as the negative electrode. However, the formation reaction of the passivation film, which is an irreversible reaction, leads to the consumption of lithium ions, resulting in reduced battery capacity, and as lithium ions are consumed while the battery cycle of the battery is repeated, capacity and cycle life are degraded.

Accordingly, a method of pre-lithiating a negative electrode by intercalating lithium into the negative electrode to promote the pre-formation of a passivation film on the surface of the negative electrode, the prevention of capacity degradation, and the improvement of cycle life has been developed.

As an example of the pre-lithiation method, there is a method of introducing a negative electrode structure into a lithium salt-containing solution and electrochemically charging the negative electrode structure using a lithium metal as a counter electrode. However, in the case of this method, the negative electrode structure and the lithium metal need to be spaced by a predetermined distance to prevent an electrical short circuit, and accordingly, problems arise in that the distance and resistance required for lithium ions to be intercalated into the negative electrode structure are increased and the negative electrode structure is not uniformly pre-lithiated with lithium ions.

Therefore, there is a need for development of a method of uniformly pre-lithiating a negative electrode while achieving the purpose of pre-lithiation.

Korean Registered Patent No. 10-0291067 discloses a method of pre-lithiating a carbon electrode and a method of producing a lithium secondary battery using the same.

[Prior-Art Documents]

PATENT DOCUMENTS

Korean Registered Patent No. 10-0291067

DISCLOSURE

Technical Problem

The present invention is directed to providing a method of producing a negative electrode which is capable of preventing volume expansion and structural deformation caused by pre-lithiation, maintaining proximity and contact between negative electrode active materials, preventing an increase in resistance of a negative electrode, and realizing an excellent capacity retention rate by performing pre-lithiation while pressurizing a negative electrode at a specific pressure in the pre-lithiation of a negative electrode.

The present invention is also directed to providing a method of producing a negative electrode which is capable of improving quality consistency of a product and processability by performing pre-lithiation of a negative electrode in a roll-to-roll manner.

Technical Solution

One aspect of the present invention provides a method of producing a negative electrode, which includes: providing a negative electrode roll on which a negative electrode structure including a negative electrode current collector and a negative electrode active material layer formed on at least one surface of the negative electrode current collector is wound; providing a pre-lithiation bath containing a pre-lithiation solution, is the pre-lithiation bath being sequentially divided into an impregnation section and a pre-lithiation section; impregnating the negative electrode structure with the pre-lithiation solution while unwinding the negative electrode structure from the negative electrode roll and moving the same through the impregnation section; and pre-lithiating the impregnated negative electrode structure by disposing the impregnated negative electrode structure in the pre-lithiation section, wherein the pre-lithiating the impregnated negative structure includes: (a) disposing the impregnated negative electrode structure between two pre-lithiation structures, each pre-lithiation structure including a separator layer disposed to face the negative electrode active material layer and a lithium counter electrode layer located on the separator layer; (b) electrochemical charging the impregnated negative electrode structure while pressurizing the impregnated negative electrode structure at a pressure of 10 kPa to 3,500 kPa with the two pre-lithiation structures to form a pre-lithiated negative electrode structure; and (c) separating the two pre-lithiation structures from the pre-lithiated negative electrode structure and moving the pre-lithiated negative electrode structure out of the pre-lithiation section.

Advantageous Effects

A method of producing a negative electrode according to the present invention can prevent volume expansion and structural deformation caused by pre-lithiation, maintain proximity and contact between negative electrode active materials, prevent an increase in resistance of a negative electrode, and realize an excellent capacity retention rate by performing pre-lithiation while pressurizing a negative electrode at a specific pressure.

The method of producing a negative electrode according to the present invention can improve quality consistency of a product and processability by performing pre-lithiation of a negative electrode in a roll-to-roll manner.

[Modes of the Invention]

Terms and words used in this specification and the claims should not be interpreted as limited to commonly used meanings or meanings in dictionaries and should be interpreted with meanings and concepts which are consistent with the technological scope of the invention based on the principle that the inventors can appropriately define concepts of terms in order to describe the invention in the best way.

The terminology provided herein is merely used for the purpose of describing particular embodiments, and is not intended to be limiting of the present invention. The singular forms "a," "an," and "the" are intended to include the plural forms as well, unless the context clearly indicates otherwise.

It should be understood that the terms "comprising", "including", and/or "having", when used herein, specify the presence of stated features, integers, steps, operations, elements, components and/or combinations thereof, but do not preclude the presence or addition of one or more other features, integers, steps, operations, elements, components and/or combinations thereof.

In the present invention, an average particle diameter ($D_{50}$) may be defined as a particle diameter corresponding to 50% of the cumulative volume in a particle diameter distribution curve. The average particle diameter ($D_{50}$) may be measured using, for example, a laser diffraction method. The laser diffraction method generally allows the measurement of a particle diameter ranging from a submicron level to several millimeters and may produce a result having high reproducibility and high resolution.

Hereinafter, the present invention will be described in detail.

<Method of Producing Negative Electrode>

The present invention relates to a method of producing a negative electrode, and specifically, to a method of producing a negative electrode for a lithium secondary battery.

The method of producing a negative electrode according to the present invention includes: providing a negative electrode roll on which a negative electrode structure including a negative electrode current collector and a negative electrode active material layer formed on at least one surface of the negative electrode current collector is wound; providing a pre-lithiation bath containing a pre-lithiation solution, which is sequentially divided into an impregnation section and a pre-lithiation section; impregnating the negative electrode structure with the pre-lithiation solution while unwinding the negative electrode structure from the negative electrode roll and moving the same through the impregnation section; and pre-lithiating the impregnated negative electrode structure by disposing the impregnated negative electrode structure in the pre-lithiation section, wherein the pre-lithiation is performed by a method including the steps of: (a) disposing the impregnated negative electrode structure between two pre-lithiation structures each including a separator layer disposed to face the negative electrode active material layer and a lithium counter electrode layer formed on the separator layer; (b) pre-lithiating the impregnated negative electrode structure by electrochemical charging while pressurizing the impregnated negative electrode structure at a pressure of 10 kPa to 3,500 kPa with the two pre-lithiation structures; and (c) separating the two pre-lithiation structures from the pre-lithiated negative electrode structure and moving the pre-lithiated negative electrode structure out of the pre-lithiation section.

Hereinafter, the method of producing a negative electrode according to the present invention will be described in detail with reference to the accompanying drawings. In giving reference numerals to components of the drawings, it should be noted that the same components have the same reference numerals as much as possible although being shown in different drawings. Further, in the description of embodiments of the present invention, a detailed description of known functions and configurations incorporated herein will be omitted to avoid making the subject matter of the present invention unclear.

Figure 1:
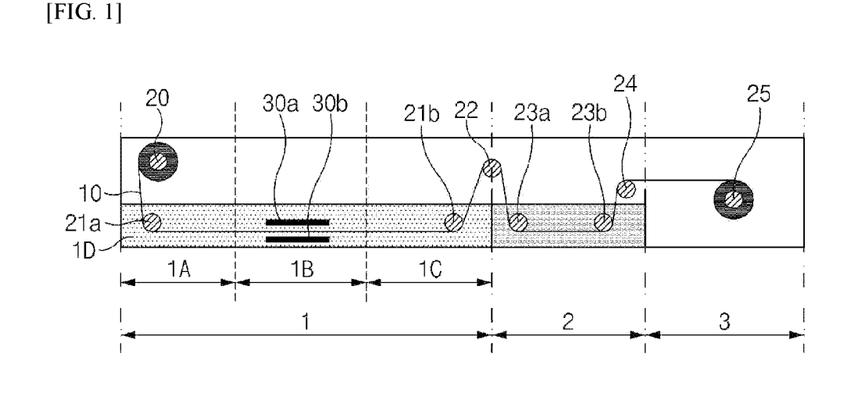
FIG. 1 is a schematic diagram for describing a method of producing a negative electrode according to the present invention.
Figure 2:
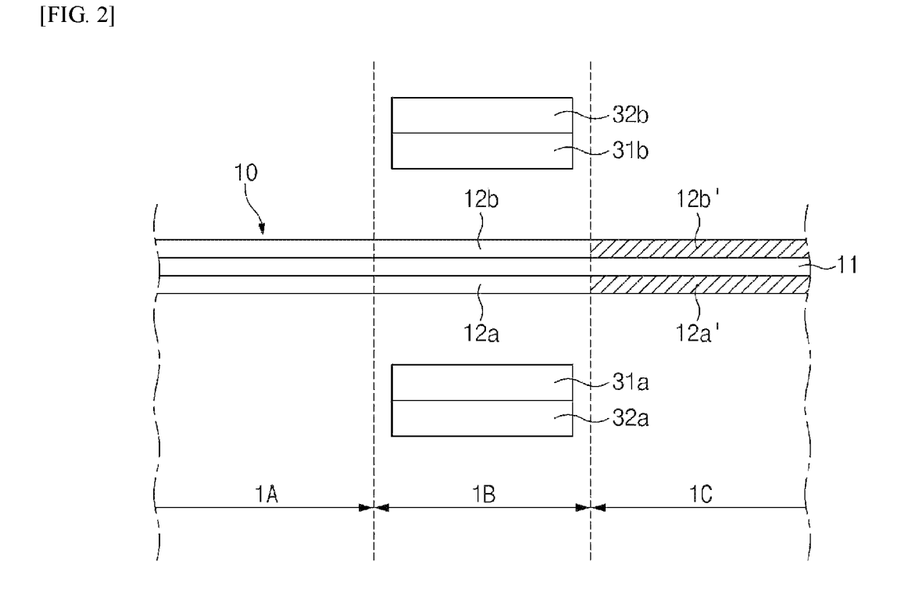
FIG. 2 is a schematic diagram for describing step (a) of a pre-lithiation process in the method of producing a negative electrode according to the present invention.
Figure 3:
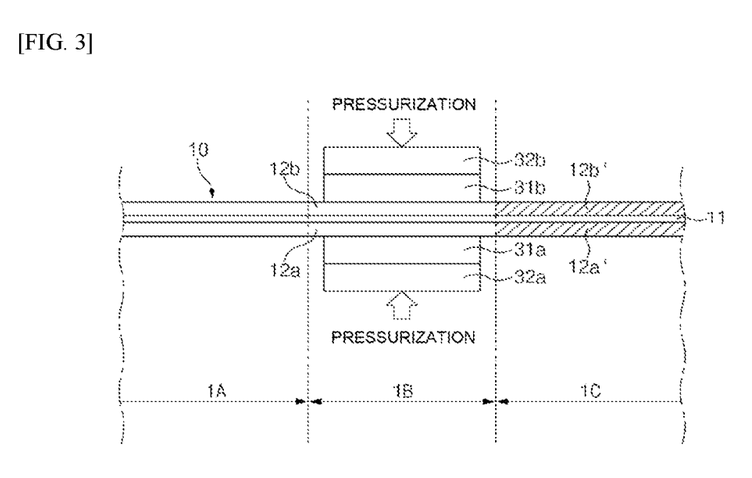
FIG. 3 is a schematic diagram for describing step (b) of a pre-lithiation process in the method of producing a negative electrode according to the present invention.
Figure 4:
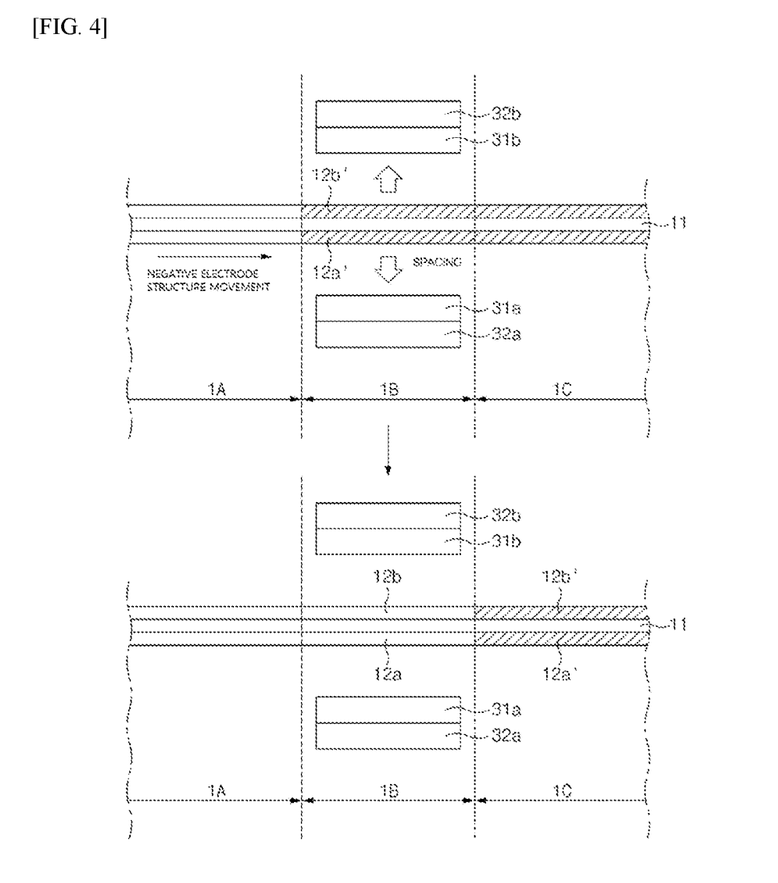
FIG. 4 is a schematic diagram for describing step (c) of a pre-lithiation process in the method of producing a negative electrode according to the present invention.
Figure 5:
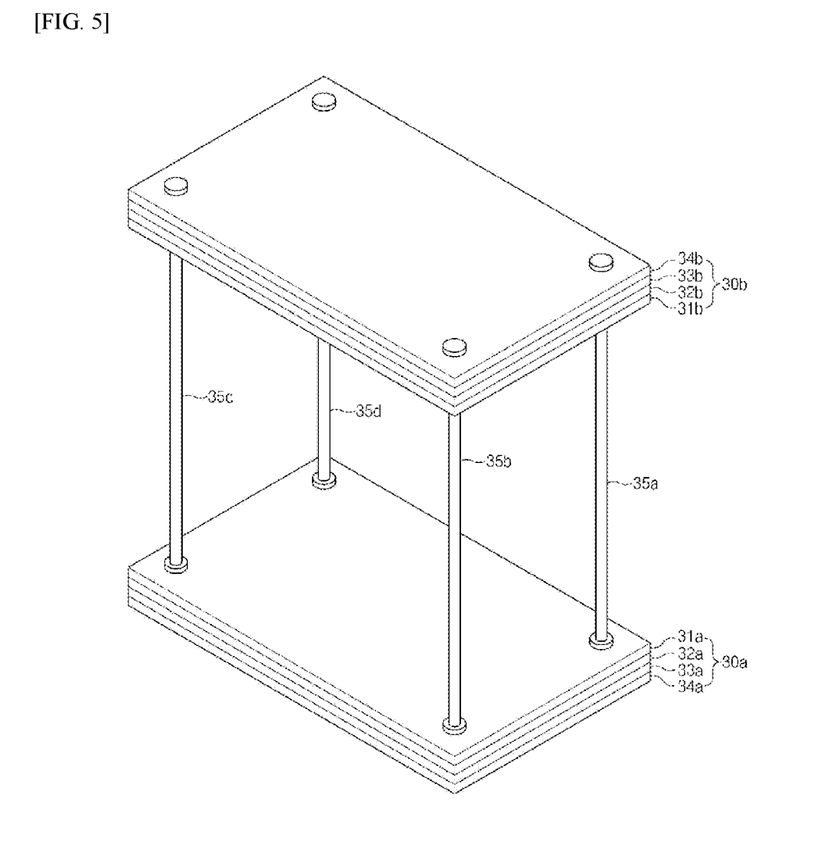
FIG. 5 is a schematic diagram for describing a pre-lithiation structure in the method of producing a negative electrode according to the present invention.

FIG. 1 is a schematic diagram for describing the method of producing a negative electrode according to the present invention. FIGS. 2 to 4 are schematic diagrams for describing step (a) to step (c) of the pre-lithiation process in the method of producing a negative electrode according to the present invention. FIG. 5 is a schematic diagram for describing the pre-lithiation structure in the method of producing a negative electrode according to the present invention.

Referring to FIG. 1, the method of producing a negative electrode according to the present invention includes providing a negative electrode roll 20 on which a negative electrode structure 10 including a negative electrode current collector and a negative electrode active material layer formed on at least one surface of the negative electrode current collector is wound.

According to the method of producing a negative electrode of the present invention, a pre-lithiation process is performed by unwinding the negative electrode structure 10 from the negative electrode roll 20 on which the negative electrode structure 10 has been wound, introducing the same into a pre-lithiation bath 1 to be described below, and moving the same through the pre-lithiation bath 1. In other words, the method of producing a negative electrode according to the present invention is a method of producing a negative electrode in a roll-to-roll manner and has an advantage of improvements in processability and quality consistency of a product because electrolyte impregnation and pre-lithiation processes may be performed at same time while the negative electrode structure moves.

The negative electrode structure 10 is wound on the negative electrode roll 20 and includes a negative electrode current collector and a negative electrode active material layer formed on at least one surface of the negative electrode current collector.

The negative electrode roll 20 may be used without limitation as long as it allows the negative electrode structure to be wound/unwound thereon/therefrom and is typically used in a roll-to-roll process.

The negative electrode current collector is not particularly limited as long as it does not cause a chemical change in the battery and has high conductivity. Specifically, as the negative electrode current collector, copper, stainless steel, aluminum, nickel, titanium, calcined carbon, copper or stainless steel whose surface has been treated with carbon, nickel, titanium, silver, or the like, an aluminum-cadmium alloy, or the like may be used.

The negative electrode current collector may typically have a thickness of 3 to 500 μm.

The negative electrode current collector may have fine irregularities formed on a surface thereof to increase the adhesion of a negative electrode active material. In addition, the negative electrode current collector may be used in any of various forms such as a film, a sheet, a foil, a net, a porous material, a foam, a non-woven fabric, and the like.

The negative electrode active material layer is formed on at least one surface of the negative electrode current collector. Specifically, the negative electrode active material layer may be formed on one surface or both surfaces of the negative electrode current collector and is preferably formed on both surfaces of the negative electrode current collector in view of the utilization of the negative electrode active material and the improvement of cell energy density.

The negative electrode active material layer includes a negative electrode active material.

The negative electrode active material may include at least one selected from the group consisting of a carbon-based active material and a silicon-based active material.

The silicon-based active material may impart excellent capacity characteristics and excellent durability to the negative electrode or the secondary battery of the present invention.

The silicon-based active material may include a compound represented by $SiO_x$ ($0 \leq x \leq 2$). Since $SiO_2$ does not react with lithium ions, it is not possible to store lithium. Therefore, it is preferable that x is within the above-described range, and the silicon-based oxide is more preferably SiO.

The silicon-based active material may have an average particle diameter ($D_{50}$) of 1 μm to 30 μm, and preferably, 3 μm to 15 μm in view of ensuring structural stability and reducing side reactions with an electrolyte during charging and discharging.

The carbon-based active material may impart excellent cycle characteristics or excellent battery lifetime characteristics to the negative electrode or the secondary battery of the present invention.

Specifically, the carbon-based active material may include at least one selected from the group consisting of artificial graphite, natural graphite, hard carbon, soft carbon, carbon black, acetylene black, Ketjen black, Super P, graphene, and fibrous carbon and preferably includes at least one selected from the group consisting of artificial graphite and natural graphite.

The carbon-based active material may have an average particle diameter ($D_{50}$) of 10 μm to 30 μm, and preferably, 15 μm to 25 μm in view of ensuring structural stability and reducing side reactions with an electrolyte during charging and discharging.

Specifically, the negative electrode active material preferably includes both the silicon-based active material and the carbon-based active material in view of improving both capacity characteristics and cycle characteristics. More specifically, the negative electrode active material preferably includes the carbon-based active material and the silicon-based active material in a weight ratio of 50:50 to 95:5, and more preferably, in a weight ratio of 60:40 to 80:20. It is preferable that the weight ratio of the carbon-based active material and the silicon-based active material is within the above-described range in view of improving both capacity characteristics and cycle characteristics.

The negative electrode active material may be included at 60 wt % to 99 wt %, and preferably, 75 wt % to 95 wt % with respect to the total weight of the negative electrode active material layer in the negative electrode active material layer.

The negative electrode active material layer may further include a binder and/or a conductive material in addition to the negative electrode active material.

The negative electrode active material layer may further include a binder and/or a conductive material in addition to the negative electrode active material. The binder is used to improve adhesion between the negative electrode active material layer and the negative electrode current collector to accordingly improve battery performance. The binder may include, for example, at least one selected from the group consisting of a polyvinylidene fluoride-hexafluoropropylene copolymer (PVDF-co-HFP), polyvinylidene fluoride (PVDF), polyacrylonitrile, polymethyl methacrylate, polyvinyl alcohol, carboxymethylcellulose (CMC), starch, hydroxypropylcellulose, regenerated cellulose, polyvinylpyrrolidone, polytetrafluoroethylene, polyethylene, polypropylene, polyacrylic acid, an ethylene-propylene-diene monomer (EPDM), a sulfonated EPDM, styrene butadiene rubber (SBR), fluorine rubber, polymers in which hydrogens thereof have been substituted with Li, Na, Ca, or the like, and various copolymers thereof.

The binder may be included at 0.5 wt % to 10 wt %, and preferably, 1 wt % to 5 wt % with respect to the total weight of the negative electrode active material layer in the negative electrode active material layer.

The conductive material is not particularly limited as long as it does not cause a chemical change in the produced battery and has conductivity. As the conductive material, graphite such as natural graphite, artificial graphite, or the like; carbon black such as carbon black, acetylene black, Ketjen black, channel black, furnace black, lamp black, thermal black, or the like; a conductive fiber such as carbon fibers, metal fibers, or the like; a conductive tube such as carbon nanotubes or the like; fluorocarbon; a metal powder such as aluminum powder and nickel powder, or the like; a conductive whisker consisting of zinc oxide, potassium titanate, or the like; a conductive metal oxide such as titanium oxide or the like; or a conductive material such as a polyphenylene derivative or the like may be used.

The conductive material may be included at 0.5 wt % to 10 wt %, and preferably, 1 wt % to 5 wt % with respect to the total weight of the negative electrode active material layer in the negative electrode active material layer.

The negative electrode active material layer may have a thickness of 10 μm to 100 μm, and preferably, 50 pin to 80 μm.

The method of producing a negative electrode according to the present invention includes providing a pre-lithiation bath 1 which is sequentially divided into an impregnation section 1A and a pre-lithiation section 1B and contains a pre-lithiation solution 1D.

The pre-lithiation bath 1 may be provided as a place where the negative electrode structure 10 unwound from the negative electrode roll 20 may be impregnated with an electrolyte and pre-lithiated while moving through the pre-lithiation bath.

The size and shape of the pre-lithiation bath 1 may be appropriately designed in consideration of the degrees of the impregnation and pre-lithiation of the negative electrode structure 10, the movement distance of the negative electrode structure according to roll-to-roll processing, or the like.

The pre-lithiation bath contains the pre-lithiation solution 1D. The pre-lithiation bath 1 is at least partially filled with the pre-lithiation solution 1D, and the negative electrode structure 10 unwound from the negative electrode roll 20 is introduced into the pre-lithiation solution 1D and moves through the sections of the pre-lithiation bath 1.

The pre-lithiation solution 1D may include a lithium salt and an organic solvent.

The organic solvent is not particularly limited as long as it may serve as a medium through which ions involved in an electrochemical reaction can migrate. Specifically, as the organic solvent, an ester-based solvent such as methyl acetate, ethyl acetate, γ-butyrolactone, ε-caprolactone, or the like; an ether-based solvent such as dibutyl ether, tetrahydrofuran, or the like; a ketone-based solvent such as cyclohexanone or the like; an aromatic hydrocarbon-based solvent such as benzene, fluorobenzene, or the like; a carbonate-based solvent such as dimethyl carbonate (DMC), diethyl carbonate (DEC), ethyl methyl carbonate (EMC), ethylene carbonate (EC), propylene carbonate (PC), or the like; an alcohol-based solvent such as ethyl alcohol, isopropyl alcohol, or the like; a nitrile such as R-CN (R is a C2-C20 hydrocarbon group with a linear, branched or cyclic structure and may include a double-bonded aromatic ring or an ether linkage) or the like; an amide such as dimethylformamide or the like; dioxolane such as 1,3-dioxolane or the like; or sulfolane may be used. Among those listed above, a carbonate-based solvent is preferred, and EMC, EC, or the like is more preferred in view of improving electrochemical stability.

The lithium salt may include at least one selected from the group consisting of $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, and $LiB(C_2O_4)_2$ and preferably includes $LiPF_6$.

A concentration of the lithium salt may range from 0.1 M to 3 M, and preferably, 0.5 M to 1.5 M based on the pre-lithiation solution, and it is preferable that the concentration of the lithium salt is within the above-described range so that the lithium salt can be sufficiently dissolved so that lithium ions can be smoothly intercalated into the active material.

In view of stabilizing the surface of the negative electrode active material to smoothly perform pre-lithiation, the pre-lithiation solution may further include at least one additive selected from the group consisting of fluoroethylene carbonate (FEC), vinylene carbonate (VC), polystyrene (PS), succinonitrile, ethylene glycol bis(propionitrile) ether, and lithium bis(fluorosulfonyl)imide (LiFSI) and preferably further includes FEC.

The additive may be included at 0.1 wt % to 15 wt %, and preferably, 0.5 wt % to 5 wt % with respect to the total weight of the pre-lithiation solution in the pre-lithiation solution in view of stabilizing the surface of the negative electrode active material to smoothly perform pre-lithiation.

The pre-lithiation bath is sequentially divided into the impregnation section and the pre-lithiation section. The impregnation section and the pre-lithiation section are not partitioned in a closed manner in the pre-lithiation bath but abstractly partitioned according to the position of the negative electrode structure in the pre-lithiation bath and the process performed at the position of the negative electrode structure. For example, as shown in FIG. 1, the impregnation section 1A and the pre-lithiation section 1B, or additionally, an aging section 1C are abstractly partitioned through a dotted line in the pre-lithiation bath 1.

As the pre-lithiation bath 1 contains the pre-lithiation solution 1D, the pre-lithiation solution 1D is also contained in the impregnation section 1A and the pre-lithiation section 1B which are partitioned in the pre-lithiation bath 1.

In the impregnation section 1A and the pre-lithiation section 1B, one or more fixed rolls 21a, 21b may be disposed so that the negative electrode structure 10 unwound from the negative electrode roll 20 may smoothly move through the individual sections. The fixed rolls 21a, 21b are fixedly disposed in the pre-lithiation bath 1, and the unwound negative electrode structure 10 may move through the individual sections in the pre-lithiation bath 1 along the fixed rolls 21a, 21b.

The size or length of the impregnation section 1A and the pre-lithiation section 1B may be appropriately designed in consideration of the degrees of electrolyte impregnation and pre-lithiation of the negative electrode structure 10.

A temperature of the pre-lithiation bath 1 or the pre-lithiation solution 1D may range from 10° C. to 80° C., preferably 20° C. to 60° C., and more preferably 25° C. to 40° C. When the temperature thereof is within the above-described range, the pre-lithiation of a negative electrode and the diffusion of lithium ions into the negative electrode structure can smoothly proceed.

The method of producing a negative electrode according to the present invention includes impregnating the negative electrode structure 10 with the pre-lithiation solution 1D while unwinding the negative electrode structure 10 from the negative electrode roll 20 and moving the same through the impregnation section 1A.

The negative electrode structure 10 unwound from the negative electrode roll 20 is introduced into the pre-lithiation bath 1 and moves through the impregnation section 1A. Specifically, the negative electrode structure 10 unwound from the negative electrode roll 20 may move through the impregnation section 1A along the fixed rolls 21a, 21b.

As the negative electrode structure 10 moves through the impregnation section 1A, electrolyte impregnation is achieved by the pre-lithiation solution 1D contained in the impregnation section 1A. Due to the electrolyte impregnation, lithium ions may be more smoothly intercalated in the negative electrode structure 10.

The time taken for the negative electrode structure to move through the impregnation section may be 1 times to 10 times, and more preferably, 1.5 times to 5 times the time taken to perform step (b) of a pre-lithiation method of the negative electrode structure to be described below. When the time is within the above-described range, it is possible to form a more uniform passivation film in pre-lithiation to be described below and perform pre-lithiation.

The method of producing a negative electrode according to the present invention includes pre-lithiating the impregnated negative electrode structure 10 by disposing the impregnated negative electrode structure in the pre-lithiation section 1B. Specifically, the negative electrode structure 10 having passed through the impregnation section enters the pre-lithiation section 1B and is then disposed or fixed in the pre-lithiation section 1B.

In the method of producing a negative electrode according to the present invention, the pre-lithiation is performed by a method including the steps of: (a) disposing the impregnated negative electrode structure 10 between two pre-lithiation structures 30a, 30b including separator layers 31a, 31b disposed to face negative electrode active material layers 12a, 12b and lithium metal layers 32a, 32b formed on the separator layers 31a, 31b; (b) pre-lithiating the impregnated negative electrode structure 10 by electrochemical charging while pressurizing the impregnated negative electrode structure 10 at a pressure of 10 kPa to 3,500 kPa with the two pre-lithiation structures 30a, 30b; and (c) separating the two pre-lithiation structures 30a, 30b from the pre-lithiated negative electrode structure 10 and moving the pre-lithiated negative electrode structure 10 out of the pre-lithiation section 1B.

Hereinafter, the steps (a) to (c) of the pre-lithiation process will be described with reference to FIGS. 2 to 5. Specifically, FIG. 2 is a schematic diagram for describing the step (a) of the pre-lithiation process, FIG. 3 is a schematic diagram for describing the step (b) of the pre-lithiation process, and FIG. 4 is a schematic diagram for describing the step (c) of the pre-lithiation process. FIGS. 2 to 4 show the impregnation section 1A, the pre-lithiation section 1B, and the aging section 1C in the pre-lithiation bath 1 and also show that the negative electrode structure 10 is disposed in and moves through the individual sections. In addition, FIG. 5 is a schematic diagram for describing the structure of the pre-lithiation structure.

In the method of producing a negative electrode according to the present invention, since the impregnated negative electrode structure is pre-lithiated while pressurizing the impregnated negative electrode structure at a specific pressure between the pre-lithiation structures, even when lithium is intercalated into the negative electrode structure or the negative electrode active material through the pre-lithiation, it is possible to maintain the distance between negative electrode active materials, prevent the volume expansion and structural deformation of the negative electrode structure, and improve the consistency of pre-lithiation. Accordingly, a negative electrode produced by the method of producing a negative electrode according to the present invention may be prevented from having increased resistance and realize an excellent capacity retention rate and improved cycle characteristics.

In addition, the method of producing a negative electrode according to the present invention is preferred in that the electrolyte impregnation process in the impregnation section and the pre-lithiation process in the pre-lithiation section may be continuously performed, and thus processability in the production of a product and quality consistency of a product can be improved.

Referring to FIGS. 2 and 5, the pre-lithiation includes the step (a) of disposing the impregnated negative electrode structure 10 between two pre-lithiation structures 30a, 30b including separator layers 31a, 31b disposed to face the negative electrode active material layers 12a, 12b and lithium metal layers 32a, 32b formed on the separator layers 31a, 31b.

The pre-lithiation structures 30a, 30b include the separator layers 31a, 31b disposed to face the negative electrode active material layers 12a, 12b and the lithium metal layers 32a, 32b formed on the separator layers 31a, 31b. In addition, there are two pre-lithiation structures 30a, 30b.

The separator layers 31a, 31b may prevent an electrical short circuit that may occur when the negative electrode structure 10 and the lithium metal layers 32a, 32b are brought into direct contact during pressurization and electrochemical charging of the negative electrode structure 10 and also prevent a problem in which the intercalation rate of lithium into the negative electrode structure 10 is not controlled when the negative electrode structure 10 and the lithium metal layers 32a, 32b are brought into direct contact.

The separator layers 31a, 31b preferably exhibit low resistance to the migration of lithium ions and have an excellent electrolyte impregnation ability. Specifically, the separator layer may include: a porous polymer film including at least one selected from the group consisting of an ethylene polymer, a propylene polymer, an ethylene/butene copolymer, an ethylene/hexene copolymer, an ethylene/methacrylate copolymer, and a polyolefin-based polymer; a porous non-woven fabric including at least one selected from the group consisting of high-melting-point glass fiber and polyethylene terephthalate fiber; or a combination of two or more thereof. In view of ensuring mechanical stability and chemical stability, the separator layer preferably includes a porous polymer film and more preferably includes a propylene polymer.

The separator layers 31a, 31b may have a thickness of 3 to 50 μm, and preferably, 8 to 20 μm in view of smooth intercalation/diffusion of lithium into the negative electrode structure and uniform pre-lithiation.

The lithium metal layers 32a, 32b may function as a lithium source that transfers lithium ions to the negative electrode structure during pre-lithiation by electrochemical charging.

A thickness of the lithium metal layers 32a, 32b may be appropriately designed in consideration of the degree of pre-lithiation of the negative electrode active material and, specifically, may range from 10 μm to 500 μm, and preferably, from 40 μm to 200 μm.

The impregnated negative electrode structure 10 is disposed between the two pre-lithiation structures 30a, 30b, and specifically, may be disposed so that the separator layers 31a, 31b of the two pre-lithiation structures 30a, 30b face the negative electrode active material layers 12a, 12b in the negative electrode structure 10.

The pre-lithiation structures 30a, 30b may further include supporting plates 33a, 33b formed on the lithium metal layers 32a, 32b. The supporting plates 33a, 33b may be formed on a surface of the lithium metal layers 32a, 32b which is opposite to the surface on which the separator layers 31a, 31b are formed and function to evenly fix the lithium metal layers 32a, 32b.

The supporting plates 33a, 33b may include at least one selected from the group consisting of copper, stainless steel, aluminum, nickel, titanium, calcined carbon, copper, and stainless steel and preferably includes stainless steel in view of low reactivity and high stability at high voltage and low voltage and economic feasibility.

The pre-lithiation structures 30a, 30b may further include insulating plates 34a, 34b formed on the supporting plates 33a, 33b. The insulating plates 34a, 34b may function to allow current to be concentrated in the pre-lithiation rather than being consumed outside the pre-lithiation structure during electrochemical charging.

The insulating plates 34a, 34b may include at least one selected from the group consisting of polyether ether ketone (PEEK), polypropylene (PP), polyethylene (PE), and Teflon and preferably includes Teflon in view of durability against an electrolyte solution and electrochemical stability.

One or more supports 35a, 35b, 35c, 35d which connect the two pre-lithiation structures 30a, 30b may be installed between the two pre-lithiation structures 30a, 30b. The supports 35a, 35b, 35c, 35d may fix the two pre-lithiation structures 30a, 30b and allow the negative electrode structure 10 to be more stably pressurized. Specifically, the pre-lithiation structures 30a, 30b may move in a vertical direction of the negative electrode structure 10 between the supports 35a, 35b, 35c, 35d.

The supports 35a, 35b, 35c, 35d may include at least one selected from the group consisting of copper, stainless steel, aluminum, nickel, titanium, calcined carbon, copper, and stainless steel and preferably includes stainless steel in view of low reactivity and high stability at high voltage and low voltage and economic feasibility.

Referring to FIG. 3, the pre-lithiation includes the step (b) of pre-lithiating the impregnated negative electrode structure 10 by electrochemical charging while pressurizing the impregnated negative electrode structure 10 at a pressure of 10 kPa to 3,500 kPa with the two pre-lithiation structures 30a, 30b.

The impregnated negative electrode structure 10 is pressurized at a pressure of 10 kPa to 3,500 kPa. When the negative electrode structure 10 is pressurized at a pressure of less than 10 kPa, the volume expansion of a negative electrode may not be suppressed due to insufficient pressure applied during the pressurization, and the negative electrode active materials may not be smoothly brought into contact. On the other hand, when the negative electrode structure 10 is pressurized at a pressure of more than 3,500 kPa, the negative electrode structure 10 may be damaged due to excessively high pressure, and the negative electrode active material may structurally collapse and be damaged, thereby deteriorating the lifetime characteristics of a cell.

The impregnated negative electrode structure 10 may be pressurized at a pressure of 300 kPa to 2,000 kPa, and more preferably, 1,300 kPa to 1,850 kPa. When the pressurization is performed at a pressure within the above-described range, the negative electrode active material can be prevented from being damaged and structurally collapsing, and volume expansion caused by pre-lithiation can also be prevented. In addition, the contact between the negative electrode active materials can be improved, thereby preventing an increase in resistance.

The pressurization may use hydraulic pressure or air pressure.

The impregnated negative electrode structure 10 is pre-lithiated by electrochemical charging during the above-described pressurization with the pre-lithiation structures 30a, 30b. The impregnated negative electrode active material layers 12a, 12b may be pre-lithiated to form pre-lithiated negative electrode active material layers 12a', 12b'.

The electrochemical charging may be performed by an oxidation-reduction reaction of the pressurized negative electrode structure 10 using an electrochemical charging/discharging device. The lithium metal layers 32a, 32b in the pre-lithiation structures 30a, 30b may function as a counter electrode for the negative electrode structure 10.

The pre-lithiation may be performed at a current density of 0.2 mA/cm$^2$ to 10 mA/cm$^2$, and preferably, 2 mA/cm$^2$ to 6 mA/cm$^2$. When the electrochemical charging is performed at a current density within the above-described range, the negative electrode active material can be stably and uniformly pre-lithiated.

The pre-lithiation may be performed by electrochemical charging to 5 to 50%, preferably, 15 to 35% of the state of charge (SoC) of the negative electrode structure. It is preferable that the pre-lithiation is performed by electrochemical charging to the above-described range so that a passivation film can be uniformly and stably formed on the surface of the negative electrode structure, and thus the reversible capacity of a battery can be improved, resulting in improvement of cycle characteristics of the battery.

Referring to FIG. 4, the pre-lithiation includes the step (c) of separating the two pre-lithiation structures 30a, 30b from the pre-lithiated negative electrode structure 10 and moving the pre-lithiated negative electrode structure 10 out of the pre-lithiation section 1B.

As the two pre-lithiation structures 30a, 30b are separated from the pre-lithiated negative electrode structure 10, and the pre-lithiated negative electrode structure 10 is moved out of the pre-lithiation section 1B, the subsequent impregnated negative electrode structure 10 is disposed in the pre-lithiation section and pre-lithiated by the steps (a) to (c). Accordingly, the continuous pre-lithiation of the negative electrode structure and the production of a negative electrode are possible.

The step (b) of the pre-lithiation method may be performed for 5 minutes to 120 minutes, preferably 10 minutes to 90 minutes, and more preferably 15 minutes to 40 minutes. When the time taken to perform the step (b) is within the above-described range, the negative electrode active material can be more uniformly pre-lithiated, productivity of a negative electrode can be improved, and an increase in by-products in a negative electrode due to excessive pre-lithiation can be prevented.

Referring to FIG. 1, the method of producing a negative electrode according to the present invention may further include washing the pre-lithiated negative electrode structure 10 by taking the pre-lithiated negative electrode structure 10 out of the pre-lithiation bath 1, introducing the structure into a washing bath 2 containing an organic solvent 2A, and moving the same through the washing bath 2.

Since the method of producing a negative electrode according to the present invention further includes the washing process after the pre-lithiation of the negative electrode structure 10, impurities remaining in the negative electrode structure 10 may be removed.

The washing process may be performed by taking the pre-lithiated negative electrode structure 10 out of the pre-lithiation bath 1 and introducing the same into the separately arranged washing bath 2.

The washing process may be performed by discharging the pre-lithiated negative electrode structure 10 from the pre-lithiation bath 1 and introducing the same into the washing bath 2 through a fixed roll 22 disposed between the pre-lithiation bath 1 and the washing bath 2, and the pre-lithiated negative electrode structure 10 may be washed while moving through the washing bath 2. The movement of the negative electrode structure 10 through the washing bath 2 may proceed by separately arranged fixed rolls 23a, 23b.

The washing bath 2 contains the organic solvent 2A, specifically, the organic solvent 2A not containing a lithium salt. The pre-lithiated negative electrode structure 10 is washed while moving in the solution not containing a lithium salt. As the organic solvent 2A, the organic solvent listed in the description of the pre-lithiation solution may be used.

The time taken for the pre-lithiated negative electrode structure 10 to move through the washing bath 2 is 0.1 times to 5 times, more preferably, 0.5 times to 2 times the time taken to perform the step (b) of the pre-lithiation method of the negative electrode structure. When the time is within the above-described range, impurities remaining in the negative electrode structure can be smoothly removed.

Referring to FIG. 1, the method of producing a negative electrode according to the present invention may further include drying the washed negative electrode structure 10.

Through the drying process, the organic solvent remaining in the negative electrode structure after the impregnation, pre-lithiation, aging, and/or washing processes may be removed.

Specifically, the drying process may be performed by taking the washed negative electrode structure 10 out of the washing bath 2, introducing the same into a separately arranged drying part 3, and moving the same through the drying part 3. A fixed roll 24 may be disposed between the washing bath 2 and the drying part 3, and the negative electrode structure 10 may move along the fixed roll 24.

The drying process may be performed by air or an inert gas. The inert gas may be at least one selected from the group consisting of Ar, $N_2$, and He.

The drying process may be performed at 10° C. to 80° C., preferably 20° C. to 60° C., and more preferably 25° C. to 40° C. It is preferable that the drying process is performed at a temperature within the above-described range so that the negative electrode structure can be prevented from being oxidized and maintained in the pre-lithiated state.

The time taken to dry the washed negative electrode structure 10 may be 0.1 times to 5 times, and preferably, 0.5 times to 2 times the time taken to perform the step (b) of the pre-lithiation method of the negative electrode structure. It is preferable that the time is within the above-described range so that the organic solvent remaining in the negative electrode structure can be smoothly removed, and damage to the negative electrode structure which may be caused by the organic solvent remaining in the negative electrode structure for a long time can be prevented.

In the drying part 3, a collecting roll 25 may be installed, and the negative electrode structure 10 that has moved through the drying part 3 may be wound on the collecting roll 25.

Referring to FIG. 1, according to the method of producing a negative electrode of the present invention, the pre-lithiation bath is sequentially divided into the impregnation section 1A, the pre-lithiation section 1B, and the aging section 1C, and the method may further include aging the negative electrode structure having passed through the pre-lithiation section by conveying the negative electrode structure to the aging section 1C.

That is, the pre-lithiation bath may be partitioned so that it includes the aging section 1C as well as the impregnation section 1A and the pre-lithiation section 1B.

As the pre-lithiated negative electrode structure 10 moves through the aging section 1C containing the pre-lithiation solution 1D, lithium ions intercalated by pre-lithiation may be more uniformly diffused on the surface and in the inside of the negative electrode active material, and the irreversible capacity of the negative electrode active material may be sufficiently removed.

The pre-lithiation bath 1 is partitioned so that the aging section 1C is not completely isolated from the impregnation section 1A and the pre-lithiation section 1B and may be abstractly partitioned according to the position of the negative electrode structure in the pre-lithiation bath 1 and the process performed at the position of the negative electrode structure.

As the pre-lithiation bath 1 contains the pre-lithiation solution 1D, the pre-lithiation solution 1D is also contained in the aging section 1C which is partitioned in the pre-lithiation bath 1. The description of the composition of the pre-lithiation solution has been described above.

In the aging section 1C, one or more fixed rolls may be disposed so that the negative electrode structure unwound from the negative electrode roll 20 may smoothly move.

The time taken for the negative electrode structure to move through the aging section may be 0.5 times to 21 times, and preferably, 1.8 times to 10 times the time taken to perform the step (b) of the pre-lithiation method of the negative electrode structure. It is preferable that the time is within the above-described range so that lithium ions may be more uniformly diffused into the negative electrode active material, and detachment of the negative electrode active material layer from the current collector due to excessive aging or an increase in resistance due to an increase in thickness of a surface coating of a negative electrode can be prevented.

When the method of producing a negative electrode according to the present invention further includes the aging process, the washing process may be performed by taking the aged negative electrode structure 10 out of the pre-lithiation bath 1, introducing the aged negative electrode structure 10 into the washing bath 2, and moving the same through the washing bath.

The descriptions of the washing process such as the washing bath 2, the washing time, and the like have been described above.

The method of producing a negative electrode according to the present invention may further include producing a negative electrode by unwinding the negative electrode structure 10 from the collecting roll 25 and cutting the same.

The negative electrode may be assembled with a positive electrode, a separator, an electrolyte, and the like as described below, and accordingly, a secondary battery, specifically a lithium secondary battery, may be produced.

The negative electrode produced by the above-described method has improved reversibility and improved initial efficiency due to the pre-lithiation and aging processes. Accordingly, the negative electrode produced by the method of the present invention is preferably applied to a secondary battery, specifically, a lithium secondary battery.

In addition, according to the above-described production method, since the electrolyte impregnation, pre-lithiation, aging, washing, and/or drying processes of the negative electrode structure may be performed at same time in a roll-to-roll manner, processability in the production of the negative electrode can be improved, and quality consistency can also be improved to a superior level.

The secondary battery may include the negative electrode produced by the above-described method, a positive electrode disposed to face the negative electrode, a separator interposed between the negative electrode and the positive electrode, and an electrolyte. Details of the negative electrode have been described above, and the positive electrode, separator, and electrolyte may be used without limitation as long as they are typically used in a lithium secondary battery.

The secondary battery is useful in the field of portable devices, such as mobile phones, notebook computers, digital cameras, and the like, and electric vehicles such as hybrid electric vehicles (HEVs).

In addition, the secondary battery may be applied to a battery module including the secondary battery as a unit cell or a battery pack including the battery module.

The battery module or battery pack may be used as a power source of one or more medium-to-large-sized devices selected from a power tool; electric vehicles (EVs), hybrid electric vehicles, and plug-in hybrid electric vehicles (PHEVs); and a system for storing electric power.

Hereinafter, the present invention will be described in detail with reference to Examples so that those skilled in the art can easily carry out the present invention. However, the present invention may be embodied in several different forms, and therefore, is not limited to Examples described herein.

EXAMPLES

Example 1: Production of Negative Electrode

<Manufacturing of Negative Electrode Structure>

A negative electrode active material was prepared by mixing natural graphite (average particle diameter ($D_{50}$): 20 μm) and SiO (average particle diameter ($D_{50}$): 5 μm) in a weight ratio of 70:30.

The negative electrode active material, Denka black as a conductive material, styrene butadiene rubber (SBR) as a binder, and carboxymethylcellulose (CMC) as a thickener were mixed in a weight ratio of 92:3:3.5:1, thereby preparing a negative electrode slurry.

The negative electrode slurry was applied onto both surfaces of a copper current collector (thickness: 8 μm), and the resulting copper current collector was roll-pressed and dried in a 130° C. vacuum oven for 12 hours to form a negative electrode active material layer (thickness: 70 μm) on both surfaces of the copper negative electrode current collector, thereby manufacturing a negative electrode structure.

The negative electrode structure was wound on a negative electrode roll made of stainless steel and having a diameter of 3 inches.

<Manufacturing of Pre-Lithiation Bath>

A pre-lithiation bath made of stainless steel and having a width, length, and height of 100 cm×20 cm×50 cm was provided. A pre-lithiation solution was added to the pre-lithiation bath so that the pre-lithiation solution was filled to 20% of the height of the pre-lithiation bath. The pre-lithiation bath was maintained at a temperature of 25° C.

The pre-lithiation solution was prepared by adding $LiPF_6$ as a lithium salt at a concentration of 1 M to an organic solvent in which ethylene carbonate (EC) and ethyl methyl carbonate (EMC) were mixed in a volume ratio of 30:70 and adding fluoroethylene carbonate (FEC) as an additive at 2 wt % with respect to the total weight of the pre-lithiation solution.

The pre-lithiation bath was divided into an impregnation section, a pre-lithiation section, and an aging section. In the impregnation section, the pre-lithiation section, and the aging section, fixed rolls were installed for smooth movement of the negative electrode structure.

In the pre-lithiation section, two pre-lithiation structures were installed to have the movement path of the negative electrode structure therebetween.

Specifically, the pre-lithiation structure included a polypropylene separator layer (thickness: 10 μm), a lithium metal layer (thickness: 150 μm) formed on the separator layer, a stainless steel supporting plate (thickness: 5 mm) formed on the lithium metal layer, and a Teflon insulating plate (thickness: 5 mm) formed on the supporting plate. In addition, the two pre-lithiation structures were connected to each other by a cylindrical support made of stainless steel. The pre-lithiation structures were disposed so that the separator layers faced the negative electrode active material layers of the negative electrode structure.

In addition, the impregnation section, pre-lithiation section, and aging section in the pre-lithiation bath were partitioned in a length ratio of 2:1:2.

<Pre-Lithiation>

The negative electrode structure was introduced into and moved through the pre-lithiation bath at a speed of 1 cm/min while being unwound from the negative electrode roll.

(a) The unwound negative electrode structure entered the impregnation section and was moved therethrough for 40 minutes, thereby impregnating the negative electrode structure with an electrolyte solution.

(b) The negative electrode structure having passed through the impregnation section entered the pre-lithiation section, was stopped in the pre-lithiation section, and disposed/fixed between the two pre-lithiation structures.

The negative electrode structure was pre-lithiated by electrochemical charging while pressurizing the negative electrode structure at a pressure of 1,000 kPa with the two pre-lithiation structures. The pressurization was performed by applying hydraulic pressure to the negative electrode structure using a hydraulic pressure controller while raising the lower pre-lithiation structure so as to be brought into close contact with the negative electrode structure and lowering the upper pre-lithiation structure.

The pre-lithiation was performed by electrochemically charging the negative electrode structure to 18.5% SoC of the negative electrode structure at a current density of 4.68 $mA/cm^2$ using an electrochemical charging/discharging device (WBCS3000 manufactured by WonATech).

(c) The two pre-lithiation structures were separated from the pre-lithiated negative electrode structure, and the pre-lithiated negative electrode structure was moved out of the pre-lithiation section.

The time taken to perform the step (b) was 20 minutes.

The negative electrode structure having passed through the pre-lithiation section entered the aging section and was moved therethrough for 40 minutes, thereby aging the negative electrode structure.

<Washing and Drying>

A washing bath made of stainless steel and having a width, length, and height of 20 cm×20 cm×50 cm was provided. A fixed roll was installed between the pre-lithiation bath and the washing bath. The washing bath contained dimethyl carbonate (DMC) as an organic solvent so that DMC was filled to 20% of the height of the washing bath.

The aged negative electrode structure was taken out of the pre-lithiation bath along the fixed roll and introduced into and moved through the washing bath.

The time taken for the negative electrode structure to move through the washing bath was 20 minutes.

A drying part made of stainless steel and having a width, length, and height of 20 cm×20 cm×50 cm was provided. A temperature of the drying part was 25° C., and the drying part was filled with air. A fixed roll was installed between the washing bath and the drying part. A collecting roll was installed in the drying part.

The washed negative electrode structure was introduced into the drying part along the fixed roll, and the time taken for the negative electrode structure to move through the drying part was 20 minutes.

The negative electrode structure that had moved through the drying part was wound on the collecting roll.

Example 2: Production of Negative Electrode

A negative electrode of Example 2 was produced in the same manner as in Example 1 except that a pressure of 500 kPa was applied in pressurization.

Example 3: Production of Negative Electrode

A negative electrode of Example 3 was produced in the same manner as in Example 1 except that a pressure of 1,800 kPa was applied in pressurization.

Example 4: Production of Negative Electrode

A negative electrode of Example 4 was produced in the same manner as in Example 1 except that a pressure of 25 kPa was applied in pressurization.

Example 5: Production of Negative Electrode

A negative electrode of Example 5 was produced in the same manner as in Example 1 except that a pressure of 2,500 kPa was applied in pressurization.

Example 6: Production of Negative Electrode

A negative electrode of Example 6 was produced in the same manner as in Example 1 except that a separator layer had a thickness of 5 μm.

Example 7: Production of Negative Electrode

A negative electrode of Example 7 was produced in the same manner as in Example 1 except that a separator layer had a thickness of 30 μm.

Comparative Example 1: Production of Negative Electrode

A negative electrode of Comparative Example 1 was produced in the same manner as in Example 1 except that a separator layer was excluded in a pre-lithiation structure, pressurization was not performed in pre-lithiation, and a negative electrode structure was electrochemically charged while being spaced 3 mm from a pre-lithiation structure.

Comparative Example 2: Production of Negative Electrode

A negative electrode of Comparative Example 2 was produced in the same manner as in Example 1 except that a separator layer was excluded in a pre-lithiation structure, pressurization was not performed in pre-lithiation, and a negative electrode structure was electrochemically charged while being spaced 5 mm from a pre-lithiation structure.

Experimental Example 1: Evaluation of Capacity Retention Rate

<Production of Lithium Secondary Battery>

The negative electrodes produced in Examples 1 to 7 and Comparative Examples 1 and 2 were cut into a size of 3 cm×4 cm.

$LiNi_{0.8}Co_{0.1}Mn_{0.1}O_2$ as a positive electrode active material, Super C as a conductive material, and polyvinylidene fluoride (PVDF) as a binder were mixed in a weight ratio of 97:1.5:1.5 to prepare a positive electrode slurry, the positive electrode slurry was applied onto an aluminum current collector, and the resulting aluminum current collector was roll-pressed and dried at 130° C., thereby producing a positive electrode.

A polypropylene separator was interposed between the negative electrode according to each of Examples 1 to 7 and Comparative Examples 1 and 2 and the above-produced positive electrode, and an electrolyte was injected, thereby producing a lithium secondary battery. The electrolyte was prepared by adding $LiPF_6$ as a lithium salt at a concentration of 1 M to an organic solvent in which EC and EMC were mixed in an volume ratio of 30:70 and adding FEC as an additive at 2 wt % with respect to the total weight of the pre-lithiation solution.

<Evaluation of Capacity Retention Rate>

The discharge capacity and capacity retention rate of the lithium secondary batteries according to Examples 1 to 7 and Comparative Examples 1 and 2 were evaluated using an electrochemical charging/discharging device. In this case, the lithium secondary batteries were charged while applying current at a current density of 0.1 C-rate up to 4.2 V and discharged at the same current density up to 2.5 V.

The capacity retention rate was evaluated by measuring the discharge capacities of the lithium secondary batteries according to Examples 1 to 7 and Comparative Examples 1 and 2 at $1^{st}$ and $100^{th}$ cycles and substituting the resulting values into the following Equation 1, and results thereof are shown in the Table 1 below.

[Equation 1]

$$\text{Capacity retention rate (\%)} = (\text{Discharge capacity at } 100^{th} \text{ cycle})/(\text{Discharge capacity at } 1^{st} \text{ cycle}) \times 100$$

TABLE 1

| | Capacity retention rate (%) @ $100^{th}$ cycle |
|---|---|
| Example 1 | 94 |
| Example 2 | 94 |
| Example 3 | 95 |
| Example 4 | 91 |
| Example 5 | 92 |
| Example 6 | 90 |
| Example 7 | 89 |
| Comparative Example 1 | 82 |
| Comparative Example 2 | 79 |

Referring to Table 1, it can be seen that the negative electrodes of Examples 1 to 7 of the present invention, which had been pressurized with the pre-lithiation structure and pre-lithiated, exhibited significantly excellent lifetime characteristics compared to the negative electrodes of Comparative Examples 1 and 2.

LIST OF REFERENCE NUMERALS

1: pre-lithiation bath
1A: impregnation section
1B: pre-lithiation section
1C: aging section
1D: pre-lithiation solution 2: washing bath
2A: organic solvent
3: drying part
10: negative electrode structure
11: negative electrode current collector
12: negative electrode active material layer before pre-lithiation
12': negative electrode active material layer after pre-lithiation
20: negative electrode roll
21a, 21b, 22, 23a, 23b, 24: fixed roll
25: collecting roll
30a, 30b: pre-lithiation structure
31a, 31b: separator layer
32a, 32b: lithium metal layer
33a, 33b: supporting plate
34a, 34b: insulating plate
35a, 35b, 35c, 35d: support

The invention claimed is:

1. A method of producing a negative electrode, comprising:
    providing a negative electrode roll on which a negative electrode structure including a negative electrode current collector and a negative electrode active material layer formed on at least one surface of the negative electrode current collector is wound;
    providing a pre-lithiation bath containing a pre-lithiation solution, the pre-lithiation bath being sequentially divided into an impregnation section and a pre-lithiation section;
    impregnating the negative electrode structure with the pre-lithiation solution while unwinding the negative electrode structure from the negative electrode roll and moving the negative electrode structure through the impregnation section; and
    pre-lithiating the impregnated negative electrode structure by disposing the impregnated negative electrode structure in the pre-lithiation section,
    wherein the pre-lithiating the impregnated negative electrode structure includes:
    (a) disposing the impregnated negative electrode structure between two pre-lithiation structures, each pre-lithiation structure including a separator layer disposed to face the negative electrode active material layer and a lithium counter electrode layer located on the separator layer;
    (b) electrochemical charging the impregnated negative electrode structure while pressurizing the impregnated negative electrode structure at a pressure of 10 kPa to 3,500 kPa with the two pre-lithiation structures to form a pre-lithiated negative electrode structure; and
    (c) separating the two pre-lithiation structures from the pre-lithiated negative electrode structure and moving the pre-lithiated negative electrode structure out of the pre-lithiation section.

2. The method of claim 1, wherein step (b) is performed for 5 minutes to 120 minutes.

3. The method of claim 1, wherein a time taken for the negative electrode structure to move through the impregnation section is 1 times to 10 times a time taken to perform step (b).

4. The method of claim 1, wherein the pre-lithiation bath is sequentially divided into the impregnation section, the pre-lithiation section, and an aging section, and
    wherein the method further comprises aging the pre-lithiated negative electrode structure having passed through the pre-lithiation section by conveying the pre-lithiated negative electrode structure to the aging section.

5. The method of claim 4, wherein a time taken for the pre-lithiated negative electrode structure to move through the aging section is 0.5 times to 21 times the time taken to perform step (b).

6. The method of claim 4, further comprising washing the aged negative electrode structure by taking the aged negative electrode structure out of the pre-lithiation bath, introducing the aged negative electrode structure into a washing bath containing an organic solvent, and moving the aged negative electrode structure through the washing bath to form a washed negative electrode structure.

7. The method of claim 6, further comprising drying the washed negative electrode structure.

8. The method of claim 1, further comprising washing the pre-lithiated negative electrode structure by taking the pre-lithiated negative electrode structure out of the pre-lithiation bath, introducing the pre-lithiated negative electrode structure into a washing bath containing an organic solvent, and moving the pre-lithiated negative electrode structure through the washing bath to form a washed negative electrode structure.

9. The method of claim 8, wherein a time taken for the pre-lithiated negative electrode structure to move through the washing bath is 0.1 times to 5 times a time taken to perform step (b).

10. The method of claim 8, further comprising drying the washed negative electrode structure.

11. The method of claim 10, wherein the time taken to dry the washed negative electrode structure is 0.1 times to 5 times the time taken to perform step (b).

12. The method of claim 1, wherein a temperature of the pre-lithiation bath ranges from 10° C. to 80° C.

13. The method of claim 1, wherein each of the pre-lithiation structures further includes a supporting plate located on the lithium counter electrode layer and an insulating plate located on the supporting plate.

14. The method of claim 13, wherein the pre-lithiation structures are connected by a plurality of supports such that the pre-lithiation structures are movable along the plurality of supports.

* * * * *